United States Patent Office 3,591,602
Patented July 6, 1971

3,591,602
PYRROLIDINE COMPOUNDS
Ian Moyle Lockhart, Egham, Surrey, England, assignor to
Parke, Davis & Company, Detroit, Mich.
No Drawing. Filed Mar. 20, 1969, Ser. No. 808,994
Claims priority, application Great Britain, Mar. 25, 1968,
14,356/68
Int. Cl. C07d 27/04
U.S. Cl. 260—326.3                          13 Claims

ABSTRACT OF THE DISCLOSURE

1 - cyclopropylmethyl- and 1-cyclobutylmethyl-3-alkyl-3-(m - hydroxyphenyl)pyrrolidine compounds, salts and esters thereof, and their production by (a) reacting a 1-cycloalkylcarbonyl-3-alkyl-3-(m - hydroxyphenyl)pyrrolidine with a complex metal hydride reducing agent and then hydrolyzing the reaction product, (b) reacting a 1-cycloalkylmethyl-3-alkyl-3-(m - alkoxyphenyl)pyrrolidine with an acidic reagent capable of cleaving the ether linkage, and (c) reacting one of the 1-cycloalkylmethyl-3-alkyl-3-(m-hydroxyphenyl)pyrrolidines or a reactive derivative thereof with a reactive derivative of an acid to produce one of the esters. The compounds of the invention are useful both as chemical intermediates and as pharmacological agents exhibiting analgesic activity.

SUMMARY AND DETAILED DESCRIPTION

The present invention relates to new pyrrolidine compounds that are useful as pharmacological agents and to methods for their production. More particularly, the invention relates to new 1-cycloalkylmethyl - 3 - alkyl - 3 - (m-oxyphenyl)pyrrolidine compounds having the formula

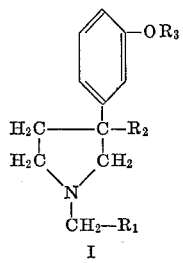

I and to pharmaceutically-acceptable salts thereof; where $R_1$ is cyclopropyl or cyclobutyl; $R_2$ is cyclopropylmethyl or a straight-chain or a branched chain alkyl group having not more than 5 carbon atoms; and $R_3$ is hydrogen or an acyl group having the formula

where $R_4$ is cyclopropyl, cyclobutyl, or an alkyl group having not more than 9 carbon atoms.

In accordance with the invention, the phenolic compounds of the invention, that is, the compounds having Formula I wherein $R_3$ is hydrogen, and salts thereof, are produced by reacting a compound having the formula

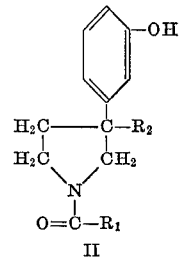

II with a complex metal hydride reducing agent in an anhydrous organic solvent medium, and then hydrolyzing the reaction product; where $R_1$ and $R_2$ have the aforementioned significance. Reducing agents that may be used include lithium aluminum hydride, a mixture of lithium aluminum hydride and aluminum chloride, and sodium dihydrobis(2-methoxyethoxy)aluminate. Suitable solvents are various unreactive anhydrous ethers, such as diethyl ether, tetrahydrofuran, dioxane, 1,2-dimethoxyethane, and diethylene glycol diethyl ether; and aromatic hydrocarbons, such as benzene and toluene; as well as mixtures of these. The temperature of the reaction is not critical and may be varied over a wide range, from 0° to about 100° C. It is usually most convenient to carry out the reaction at the reflux temperature of the reaction mixture. The duration of the reaction may be varied from about one hour to 24 hours and longer, depending on the temperature employed. At the preferred temperature of reflux, the reaction is normally complete in 3–4 hours. While equivalent amounts of reactants may be used, for best results a moderate to large excess of reducing agent is normally preferred. Following reaction with the reducing agent, the reaction product is hydrolyzed by treatment of the reaction mixture with an aqueous medium, such as water, dilute aqueous inorganic acids or bases, or other media containing water. The product can be isolated as a phenolate salt, as the free base, or as an acid-addition salt by adjustment of the pH as required.

The compounds having Formula II above, which are used as starting materials in the foregoing process, are prepared according to the following general synthetic procedure. m-Methoxybenzyl cyanide is first reacted with sodium amide and then with an alkyl bromide compound having the formula

III to produce an α-alkyl - m - methoxybenzyl cyanide compound having the formula

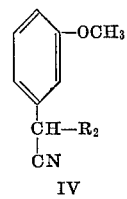

IV which in turn is reacted with sodium amide and with ethylene dichloride to give a chlorinated cyano intermediate having the formula

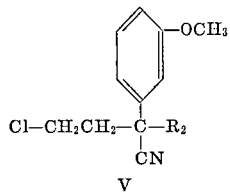

V

This intermediate is cyclized by reaction with lithium aluminum hydride, followed by hydrolysis of the reaction product, and the resulting 3-(m-methoxyphenyl)-3-alkyl-pyrrolidine having the formula

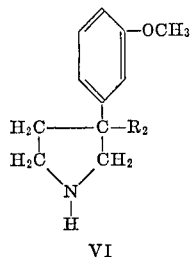

VI is reacted with either cyclopropylcarbonyl chloride or cyclobutylcarbonyl chloride in the presence of triethylamine to give an N-cycloalkylcarbonyl-3-(m-methoxyphenyl)-3-alkyl-pyrrolidine intermediate having the formula

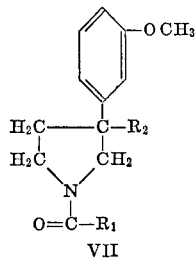

VII which is finally reacted with boron tribromide to cleave the phenolic ether and give the desired starting material of Formula II. In the foregoing Formulas III to VII, $R_1$ and $R_2$ have the same meaning as previously given. The preparation of specific starting materials of Formula II is described in detail hereinafter.

Also in accordance with the invention, the phenol compounds of the invention, that is, the compounds of Formula I wherein $R_3$ is hydrogen, and salts thereof, are produced by reacting a compound having in free base form the formula

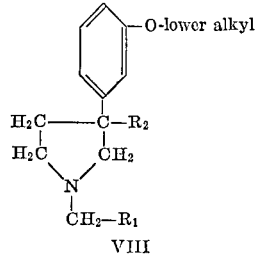

VIII with an acidic reagent capable of cleaving the ether linkage; where $R_1$ and $R_2$ are as defined earlier. When the acidic reagent is a halide of boron or aluminum, as indicated below, the initial reaction is followed by decomposition of the intermediate boron or aluminum complex that is formed. Acidic reagents that can satisfactorily be employed include constant boiling hydrochloric and hydrobromic acids, hydriodic acid, pyridine hydrochloride, aluminum chloride in carbon disulfide, aluminum chloride in nitrobenzene, aluminum bromide in benzene, boron trichloride, and boron tribromide. The preferred acidic reagents are boron tribromide and boron trichloride. When the preferred boron trihalides are used, the reaction is best carried out in an unreactive solvent such as a hydrocarbon or a halogenated hydrocarbon. A preferred solvent is methylene chloride. With these reagents, the reaction is normally carried out at a temperature in the range of from —70° to +50° C., and at such temperature is usually complete after a period of from about 15 minutes to about 12 hours. In the preferred manner of carrying out the reaction, the reactants are mixed in the chosen solvent at about —40° to —70° C. for about 30 minutes, and then the reaction mixture is allowed to warm to room temperature during a period of from one to 3 hours. Upon completion of the reaction, the mixture is treated with a hydroxylic solvent, such as methanol, to decompose the intermediate boron complex of the phenol product, as well as any unreacted boron trihalide. The final product is then isolated directly as an acid-addition salt, or following adjustment of the pH as required, as the free base or as a phenolate salt.

The general method of preparation of the compounds of Formula VIII, which are used as starting materials in the foregoing process, is illustrated hereinafter by the detailed description of the preparation of some specific examples, such as N-cyclopropylmethyl-3-(m-isopropoxyphenyl)-3-propylpyrrolidine, and intermediates therefor.

Further in accordance with the invention, the ester compounds of the invention, that is, the compounds having Formula I wherein $R_3$ is an acyl group as defined earlier and salts thereof, are produced by reacting one of the phenol compounds of the invention, that is, a compound having the formula

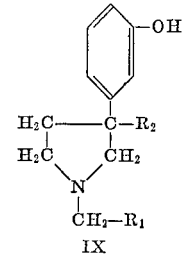

IX or a reactive derivative thereof, with a reactive derivative of an acid having the formula

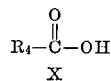

X where $R_1$, $R_2$, and $R_4$ have the same meaning as previously given. Suitable reactive derivatives of the phenol compound of Formula IX that may be used are the phenolate salts and acid-addition salts. Examples of suitable reactive derivatives of the acid of Formula X are the acid halides, especially the acid chloride, and the acid anhydride. At least an equivalent amount, and preferably an excess, of the acid derivative is employed. While the reaction can be run without added solvent, it is customary to use an unreactive solvent. Solvents that may be used include tertiary amines, various ethers, aromatic hydrocarbons, halogenated hydrocarbons, and tertiary amides. The reaction is preferably carried out in the presence of a basic catalyst, such as the tertiary amines, triethylamine and pyridine. The duration and temperature of the reaction are not critical and may be varied widely depending on the acid derivative, basic catalyst, and solvent that are employed. When an acid anhydride in pyridine solution is used, it is customary to carry out the reaction at a temperature between about 75° and 150° C. for a period of from about 30 minutes to about 6 hours, although temperatures as low as room temperature and below can be used if the reaction time is lengthened to approximately 24–48 hours. With the preferred acid chloride and triethylamine in methylene chloride solution, the reaction is normally complete after about 1–3 hours at a temperature between 0° and 30° C. The ester product is isolated either as the free base or as an acid-addition salt by adjustment of the pH as required.

The free base compounds of the invention form acid-addition salts with any of a variety of inorganic and organic acids. Pharmaceutically-acceptable acid-addition salts are formed by reaction with such acids as hydrochloric, hydrobromic, sulfuric, phosphoric, acetic, citric, maleic, succinic, and pamoic acids. The phenol compounds of the invention also form phenolate salts with any of a variety of bases, such as sodium hydroxide, potassium carbonate, and strongly basic amines. The free bases and the salt forms are interconvertible by adjustment of the pH. They differ in solubility properties, but, in general, are otherwise equivalent for the purposes of the invention. If desired, the compounds of the invention can also be obtained in optically active forms by using an optically active pyrrolidine derivative as starting material, or by resolving an optically inactive final product by fractional crystallization of a salt formed with an optically active acid.

The compounds of the invention are new chemical compounds that are useful as chemical intermediates and as pharmacological agents, especially as analgesic agents. They are of particular value as analgesic agents because their activity in relieving pain is accompanied by morphine antagonist properties. The utility of an agent that possesses analgesic activity, coupled with some antimorphine activity as a safeguard against abuse, has been demonstrated by the known clinically useful analgesic, pentazocine, which has been reported to have this combination of properties (see British Journal of Addiction, vol. 61, pages 155–167, 1966).

The analgesic activity of the compounds of the invention can be demonstrated and quantitatively determined in a standard test designed to measure the ability of a test compound to inhibit the abdominal constriction (writhing) that is observed in laboratory animals following intraperitoneal injection of acetylcholine, a known pain-producing substance. The method used has been reported by Collier et al., in the British Journal of Pharmacology and Chemotherapy, vol. 32, pages 295–310, February 1968. In this test, albino mice (Tuck T/O strain) are first randomized into groups of 5, then individually stained and injected subcutaneously with a measured dose of a test compound either dissolved in 0.9% saline or suspended in 20% gum acacia. Bases insoluble in saline are first dissolved in 1 N hydrochloric acid; saline-insoluble acids are first dissolved in 1 N sodium hydroxide. Twenty minutes following administration of the test compound as a coded solution, 10 ml. per kg. body weight of a solution containing acetylcholine bromide (3.2 mg. base/kg.) in 0.9% saline at laboratory temperature (21–25° C.) is injected intraperitoneally. This dose of acetylcholine is sufficient to cause writhing in at least 9 out of 10 control animals. Since the writhing response to acetylcholine occurs very quickly and its incidence declines after 2 minutes, the mice are next placed in a plastic box and observed for 2 minutes by an observer, who is unaware of the drug treatment given and who records the number of mice writhing within the period. The mice are also tested for discoordination by the rotating drum method described in Analyst, vol. 74, pages 592–596, 1949. By means of graded doses, the dose of test compound that inhibits writhing in 50% of the animals ($ED_{50}$) is determined, as may also be the dose that discoordinates 50% of the mice ($FD_{50}$). These values are calculated by logit analysis (See Finney, D. J., Statistical Method in Biological Assay, 2nd ed., London: Griffin, 1964). When tested by the foregoing method, known analgesic agents give an $ED_{50}$ value of less than 100 mg./kg. (subcutaneous) and an $FD_{50}/ED_{50}$ ratio greater than 4; hence, these values are taken as an indication of analgesic activity. (Pentazocine, for example, gives an $ED_{50}$ value of 2.7 mg./kg., subcutaneous, in a dose volume of 10 ml./kg.) To eliminate false positive results that may be obtained with test compounds that are anticholinergic agents, each test compound found to be active in the writhing test is also tested for anticholinergic activity by measuring its ability to protect mice from physostigmine toxicity, and its activity in this regard is compared with that of known anticholinergic agents.

The analgesic activities of some representative compounds of the present invention, as determined by the procedure described above, are given in the table that follows. In each case, anticholinergic activity was found to be absent. $ED_{50}$ values are expressed as mg. base per kg. body weight in a dose volume of 10 ml./kg.

ANALGESIC ACTIVITY

| Compound | $ED_{50}$ |
|---|---|
| (A) m-[1-(cyclopropylmethyl)-3-ethyl-3-pyrrolidinyl]phenol | 0.4 |
| (B) m-[1-(cyclopropylmethyl)-3-propyl-3-pyrrolidinyl]phenol | 0.26 |
| (C) m-[1-(cyclopropylmethyl)-3-propyl-3-pyrrolidinyl]phenol monosuccinate | 0.3 |
| (D) m-[1-(cyclopropylmethyl)-3-isobutyl-3-pyrrolidinyl]phenol | 0.06 |
| (E) m-[1-(cyclopropylmethyl)-3-propyl-3-pyrrolidinyl]phenol acetate | 0.4 |
| (F) m-[1-(cyclopropylmethyl)-3-propyl-3-pyrrolidinyl]phenol isobutyrate | 0.23 |
| (G) m-[1-(cyclobutylmethyl)-3-propyl-3-pyrrolidinyl]phenol | 3.3 |

The antimorphine activity of the compounds of the present invention can be determined in a test designed to measure the ability of a test compound to block the pain-relieving effect of morphine in mice subjected to pain from the pressure of an artery clip applied to the tail. (See Bianchi, C. and Franceschini, J., British Journal of Pharmacology and Chemotherapy, vol. 9, pages 280–284, 1954, and Collier, H. O. J., Evaluation of Drug Activities: Pharmacometrics, ed. Lawrence, D. R. and Bacharach, A. L., London: Academic Press, 1964, pages 183–203.) In this test, male albino mice (Tuck T/O strain) are randomized into groups of 10, weighed, and tested for a normal response to an artery clip of 250–300 g. opening tension placed for up to 10 seconds at the root of the tail. The mice that turn and bite the clip or squeak within 10 seconds are used in the test. Each mouse is injected with a measured dose of test compound dissolved in 0.9% saline that also contains a dose of morphine sulfate (22.2 mg. base/kg.) that suppresses response in 95% of the animals. Two or more control groups are used. In the first, 10 mice are given the same dose of morphine without test compound; in the second, 10 mice are given the highest dose of test compound without morphine. A third group may be given another dose of test compound. The dose volume in each case is 10 ml./kg. Twenty minutes after injection, each mouse is challenged with the artery clip for up to 10 seconds, and the mice not responding are counted. The mice may also be tested for discoordination. By means of graded doses, $ED_{50}$ values for antagonism of morphine and, where appropriate, $FD_{50}$ values for discoordination are obtained, and these values are compared with those of known morphine antagonists, such as the aforementioned pentazocine, which, in this test, has an $ED_{50}$ value for antagonism of the pain-relieving effect of morphine of 6.2 mg./kg. (subcutaneous).

The antimorphine activities of some representative compounds of the present invention are given in the table that follows. In this table, the compounds are the same as those listed in the Analgesic Activity table above, and can be identified by reference to that table. The $ED_{50}$ values are again expressed as mg. base per kg. body weight in a dose volume of 10 ml./kg.

ANTIMORPHINE ACTIVITY

| Compound: | ED$_{50}$ |
|---|---|
| A | 1.4 |
| B | 3.2 |
| C | 4.3 |
| D | 4.3 |
| E | 8.2 |
| F | 7.1 |
| G | 8.4 |

The invention is illustrated by the following examples.

Example 1

To a stirred suspension of 30 g. of lithium aluminum hydride in 250 ml. of dry ether, at room temperature, is carefully added a solution of 101 g. of m-[1-(cyclopropylcarbonyl)-3-ethyl-3-pyrrolidinyl]phenol in 1000 ml. of tetrahydrofuran, and the resulting mixture is heated under reflux for 3.5 hours. Upon cooling, the reaction mixture is treated with 200 ml. of saturated aqueous ammonium chloride, and filtered. The filtrate is evaporated, and the residue is mixed with ether. The ethereal mixture is extracted several times with 2 N hydrochloric acid, and the combined acidic extracts are first neutralized with 10 N sodium hydroxide and then made alkaline with 6 N ammonium hydroxide. The alkaline mixture is extracted well with ether, and the ether extract is dried and evaporated to give an oily residue of m-[1-(cyclopropylmethyl)-3-ethyl-3-pyrrolidinyl]phenol, which crystallizes upon standing; M.P. 98–100° C., following crystallization from benzene-petroleum ether.

The sodium salt of m-[1-(cyclopropylmethyl)-3-ethyl-3-pyrrolidinyl]phenol is prepared by dissolving 2.45 g. of the above product in ethanol, treating the ethanolic solution with 10 ml. of 1 N sodium hydroxide, and evaporating the resulting mixture to dryness. The potassium salt is prepared in a similar manner by substituting 10 ml. of 1 N potassium hydroxide for the 1 N sodium hydroxide.

Example 2

Utilizing a procedure analogous to that described in Example 1 above, the following m-[1-(cyclopropylmethyl)-3-lower alkyl-3-pyrrolidinyl]phenol compounds are obtained from the reduction of the m-[1-(cyclopropylcarbonyl)-3-lower alkyl-3 - pyrrolidinyl]phenol compounds designated below by reaction with lithium aluminum hydride.

(a) m - [1 - cyclopropylmethyl) - 3 - methyl-3-pyrrolidinyl]phenol, M.P. 69–70° C., following crystallization from benzene-petroleum ether; from reduction of m-[1-(cyclopropylcarbonyl)-3-methyl-3-pyrrolidinyl]phenol.

(b) m-[1 - (cyclopropylmethyl)-3-isopropyl-3-pyrrolidinyl]phenol, M.P. 69–70° C., following crystallization from benzene-petroleum ether; from reduction of m-[1-(cyclopropylcarbonyl) - 3 - isopropyl - 3-pyrrolidinyl]-phenol.

(c) m-[1-(cyclopropylmethyl)-3-butyl-3-pyrrolidinyl]-phenol, B.P. 162–164° C./0.4 mm. Hg; from reduction of m - [1 - cyclopropylcarbonyl) - 3-butyl-3-pyrrolidinyl]-phenol.

(d) m-[1 - (cyclopropylmethyl) - 3 - isobutyl - 3 - pyrrolidinyl]phenol, B.P. 141–149° C./0.05–0.09 mm. Hg; from reduction of m-[1-(cyclopropylcarbonyl)-3-isobutyl-3-pyrrolidinyl]phenol.

The monosuccinate salt of this product is obtained by treating a solution of 200 mg. of the phenol in 25 ml. of chloroform with 90 mg. of succinic acid and isolating the m-[1 - (cyclopropylmethyl)-3-isobutyl-3-pyrrolidinyl] phenol monosuccinate that precipitates; M.P. 137–139° C., following crystallization from ethanol.

(e) m-[3-sec-butyl-1-cyclopropylmethyl)-3-pyrrolidinyl] phenol, B.P. 155–158° C./0.13 mm. Hg; from reduction of m-[1-(cyclopropylcarbonyl)-3-sec-butyl-3-pyrrolidinyl] phenol.

(f) m-[1,3-bis(cyclopropylmethyl) - 3 - pyrrolidinyl] phenol, B.P. 175° C./0.2 mm. Hg; from reduction of m-[1 - (cyclopropylcarbonyl)-3-(cyclopropylmethyl)-3-pyrrolidinyl]phenol.

(g) m-[1-(cyclopropylmethyl)-3-isopentyl - 3 - pyrrolidinyl]phenol, B.P. 167° C./0.2 mm. Hg; from reduction of m-[1-(cyclopropylcarbonyl) - 3 - isopentyl-3-pyrrolidinyl]phenol.

(h) m-[1-(cyclopropylmethyl) - 3 - (2-methylbutyl)-3-pyrrolidinyl]phenol, B.P. 169–170° C./0.2 mm. Hg; from reduction of m-[1-(cyclopropylcarbonyl)-3-(2-methyl)-3-pyrrolidinyl]phenol.

(i) m-[1-(cyclopropylmethyl - 3 - (neopentyl)-3-pyrrolidinyl]phenol, B.P. 172–173° C./0.5 mm. Hg; from reduction of m-[1-(cyclopropylcarbonyl)-3-neopentyl-3-pyrrolidinyl]phenol.

Example 3

To a stirred solution of 5.0 g. of m-[1-(cyclopropylcarbonyl)-3-isobutyl-3-pyrrolidinyl]phenol in 50 ml. of benzene at 50° C. is added, over a period of 15 minutes, 12.5 ml. of a solution of sodium dihydrobis(2-methoxyethoxy)aluminate in benzene (70%; weight/volume), and after the initial exothermic reaction subsides, the reaction mixture is stirred and heated under reflux for 5 hours and kept at room temperature overnight. It is then treated carefully with 25 ml. of 5 N sodium hydroxide to decompose excess reducing agent, and the organic phase is separated and set aside. The aqueous phase is extracted with two 50-ml. portions of benzene, the extracts are combined with the separated organic phase, and the combined solution is washed with water, dried, and evaporated. The oily residue obtained is dissolved in 50 ml. of warm 2 N hydrochloric acid, excess 6 N ammonia solution is added, and the basic mixture is extracted with three 100-ml. portions of ether. The ether extract is washed with water, dried, and evaporated to give an oily residue of m-[1-(cyclopropylmethyl)-3-isobutyl-3-pyrrolidinyl]phenol; B.P. 190° C./1 mm. Hg; monosuccinate, M.P. 137–139° C.

Example 4

To a solution of 25 g. of N-cyclopropylmethyl-3-(m-methoxyphenyl)-3-propylpyrrolidine in 100 ml. of ether is added excess ethereal hydrogen chloride and the resulting mixture is evaporated to dryness. The residue, which is N - cyclopropylmethyl-3-(m-methoxyphenyl)-3-propylpyrrolidine hydrochloride, is dissolved in 150 ml. of methylene chloride, and to the resulting solution, cooled below —65° C., is slowly added a solution of 25 ml. of boron tribromide in 100 ml. of methylene chloride, while the temperature is maintained below —65° C. After addition is complete, the reaction mixture is allowed to warm to room temperature and then cooled to —10° C. while 100 ml. of methanol is added to decompose unreacted boron tribromide. The methanolic mixture is evaporated, the residue is dissolved in 250 ml. of hot 2 N sodium hydroxide, and the alkaline solution is washed with ether, acidified with 2 N hydrochloric acid and then neutralized with 6 N ammonium hydroxide. The neutral mixture is extracted with ether, and the ether extract is dried and evaporated to give m-[-(cyclopropylmethyl)-3-propyl-3-pyrrolidinyl]-phenol; B.P. 614–166° C./0.35 mm. Hg.

To a solution of 14.3 g. of m-[1-(cyclopropylmethyl)-3-propyl-3-pyrrolidinyl]phenol in 200 ml. of chloroform is added 6.5 g. of succinic acid, and the mixture is heated under reflux for 15 minutes. The hot supernatant liquid is decanted from undissolved solid and cooled. The solid succinate salt of m-[1-(cyclopropylmethyl)-3-propyl-3-pyrrolidinyl]phenol that precipitates is isolated, dried, and crystallized from ethyl acetate; M.P. 138–140° C.

Example 5

To a solution of 2 g. of N-cyclopropylmethyl-3-(m-isopropoxyphenyl)-3-propylpyrrolidine in 25 ml. of methylene chloride, cooled to −60° to −70° C., is added a solution of 2 ml. of boron tribromide in 10 ml. of methylene chloride. The resulting mixture is next allowed to warm to room temperature and is then cooled to 0° C. while 15 ml. of methanol is added. The methanolic mixture is evaporated, the residue is heated with 60 ml. of 2 N sodium hydroxide until a clear solution is obtained, and the alkaline solution is acidified with concentrated hydrochloric acid. The acidic mixture is neutralized with 6 N ammonium hydroxide, the neutral solution is extracted with methylene chloride, and the extract is dried and evaporated. The m-[1-(cyclopropylmethyl)-3-propyl-3-pyrrolidinyl]phenol that is obtained is purified by distillation under reduced pressure; B.P. 164–166° C./0.35 mm. Hg.

In the foregoing procedure, the same product is obtained when 2 ml. of boron trichloride is substituted for the boron tribromide.

Example 6

A mixture consisting of 10 g. of N-cyclobutylmethyl-3-(m-isopropoxyphenyl)-3-propylpyrrolidine and 100 ml. of 6 N hydrochloric acid is heated under reflux for 21 hours, cooled, and made alkaline with 6 N ammonium hydroxide. The alkaline mixture is extracted with methylene chloride and the extract is dried and evaporated. The m-[1-(cyclobutylmethyl)-3-propyl - 3 - pyrrolidinyl]phenol that is obtained is purified by distillation; B.P. 154–158° C./0.05 mm. Hg.

Utilizing the foregoing procedure, substituting 10 g. of N - cyclopropylmethyl - 3 - (m - isopropoxyphenyl)-3-propylpyrrolidine for the N-cyclobutylmethyl-3-(m-isopropoxyphenyl)-3-propylpyrrolirdine and heating under reflux for 4 hours, there is obtained m-[1-(cyclopropylmethyl)-3-propyl-3-pyrrolidinyl]phenol.

Example 7

A mixture consisting of 5.35 g. of m-[1-(cyclopropylmethyl)-3-propyl-3-pyrrolidinyl]phenol, 50 ml. of acetic anhydride, and 50 ml. of pyridine is heated at 95° C. for 2.5 hours, then kept at room temperature overnight, and concentrated. The residue is mixed well with xylene, the xylene is evaporated, and the m-[1-(cyclopropylmethyl)-3-propyl-3-pyrrolidinyl]phenyl acetate product obtained is purified by distillation; B.P. 139–143° C./0.3 mm. Hg.

Utilizing the foregoing procedure, with the substitution of propionic anhydride for the acetic anhydride, there is obtained m-[1-(cyclopropylmethyl)-3-propyl - 3 - pyrrolidinyl]phenyl propionate, B.P. 155–158° C./0.45–0.6 mm. Hg.

Example 8

To a stirred mixture consisting of 2.5 g. of m-[1-(cyclopropylmethyl)-3-propyl-3-pyrrolidinyl]phenol, 2.5 ml. of triethylamine, and 25 ml. of methylene chloride, cooled to 5° C., is added dropwise a solution of 1.06 g. of butyryl chloride in 10 ml. of methylene chloride, the resulting mixture is stirred at 5° C. for 2.5 hours, allowed to warm to room temperature, and it is then poured into excess 2 N aqueous sodium carbonate. The organic layer is separated and washed twice with 2 N aqueous sodium carbonate, once with water, and then twice with 2 N hydrochloric acid. It is then dried and evaporated to give m-[1-(cyclopropylmethyl) - 3 - propyl - 3 - pyrrolidinyl]phenyl butyrate hydrochloride; M.P. 170–171° C., following crystallization from benzene-cyclohexane.

Utilizing the foregoing procedure, the following ester salts are obtained from reaction of m-[1-(cyclopropylmethyl)-3-propyl-3-pyrrolidinyl]phenol with the designated acylating agent in the presence of triethylamine.

(a) From reaction with isobutyryl chloride there is obtained m-[1-(cyclopropylmethyl)-3-propyl-3-pyrrolidinyl] phenyl isobutyrate hydrochloride, M.P. 168–170° C., following crystallization from benzene-cyclohexane.

(b) From reaction with cyclopropylcarbonyl chloride there is obtained m-[1-(cyclopropylmethyl)-3-propyl-3-pyrrolidinyl]phenyl cyclopropanecarboxylate hydrochloride, M.P. 121° C., following crystallization from benzene-cyclohexane.

(c) From reaction with valeryl chloride there is obtained m-[1-(cyclopropylmethyl)-3-propyl-3-pyrrolidinyl] phenyl valerate hydrochloride, M.P. 135–136° C., following crystallization from benzene-cyclohexane.

(d) From reaction with 2-methylbutyryl chloride there is obtained m-[1-(cyclopropylmethyl)-3-propyl-3-pyrrolidinyl]phenyl 2-methylbutyrate hydrochloride, M.P. 165–166° C., following crystallization from benzene-cyclohexane.

(e) From reaction with pivalyl chloride there is obtained m-[1-(cyclopropylmethyl)-3-propyl-3-pyrrolidinyl] phenyl pivalate hydrochloride hemihydrate, M.P. 188–190° C., following crystallization from benzene.

(f) From reaction with cyclobutylcarbonyl chloride there is obtained m-[1-(cyclopropylmethyl)-3-propyl-3-pyrrolidinyl]phenyl cyclobutanecarboxylate hydrochloride one-fourth hydrate, M.P. 164–166° C.

(g) From reaction with octanoic acid chloride there is obtained m - [1 - (cyclopropylmethyl)-3-propyl-3-pyrrolidinyl]phenyl octanoate hydrochloride, M.P. 114–115° C., following crystallization from benzene-petroleum ether.

(h) From reaction with decanoic acid chloride there is obtained m - [1 - (cyclopropylmethyl)-3-propyl-3-pyrrolidinyl]phenyl decanoate hydrochloride, M.P. 95–96° C., following crystallization from benzene-petroleum ether.

Starting materials

The various starting materials and intermediates employed in the foregoing examples are prepared by the methods described in the following.

m-[1-(cyclopropylcarbonyl)-3-lower alkyl-3-pyrrolidinyl]phenols

To a stirred mixture consisting of 56.3 g. of 3-(m-methoxyphenyl)-3-ethylpyrrolidine, 45 ml. of triethylamine, and 250 ml. of methylene chloride, kept between 0 and 10° C., is slowly added a solution of 28.5 g. of cyclopropylcarbonyl chloride in 50 ml. of methylene chloride, and the resulting mixture is stirred and cooled for one hour more. It is then allowed to warm to room temperature and is washed successively with 2 N hydrochloric acid, with water, with 2 N aqueous sodium carbonate, and with saturated aqueous sodium chloride. The organic solution is then dried and evaporated to give N-cyclopropylcarbonyl-3-(m-methoxyphenyl) - 3 - ethylpyrrolidine, suitable for use in the next step without further purification. This intermediate product (32 g.) is dissolved in 50 ml. of methylene chloride, and the solution is cooled below −65° C. while a solution of 25 ml. of boron tribromide in 100 ml. of methylene chloride is slowly added. Upon completion of the addition, the mixture is first allowed to warm to room temperature and is then cooled to −10° C. while excess methanol (about 100 ml.) is added to decompose unreacted boron tribromide. The methanolic mixture is poured into saturated aqueous sodium bicarbonate, and the methylene chloride phase is separated and evaporated to give m-[1-(cyclopropylcarbonyl)-3-ethyl-3-pyrrolidinyl]phenol; M.P. 136–137° C., following crystalization from acetone.

In a manner similar to that described above, the following m-[1-(cyclopropylcarbonyl)-3-lower alkyl-3-pyrrolidinyl]phenols are prepared starting from the appropriate 3-(m-methoxyphenyl)-3-lower alkyl-pyrrolidine. In each case the intermediate N-cyclopropylcarbonyl-3-(m-methoxyphenyl)-3-lower alkyl-pyrrolidine may be used as isolated, without further purification.

(1) m - [1-cyclopropylcarbonyl)-3-isopropyl-3-pyrrolidinyl]phenol, M.P. 125–127° C., following crystallization from ethyl acetate-ether.

(2) m - [1-(cyclopropylcarbonyl)-3-butyl-3-pyrrolidinyl]phenol, M.P. 145–145.5° C.; isolated by treating the residue obtained upon evaporation of the final methylene chloride solution with excess ammonium hydroxide and then acidifying the ammoniacal solution with 2 N hydrochloric acid to precipitate the solid product.

(3) m - [1-(cyclopropylcarbonyl)-3-isobutyl-3-pyrrolidinyl]phenol, M.P. 149–151° C., following crystallization from acetone.

(4) m - [1-(cyclopropylcarbonyl)-3-sec-butyl-3-pyrrolidinyl]phenol, isolated as an oil that is used without further purification.

(5) m - [1-(cyclopropylcarbonyl) - 3 - (cyclopropylmethyl)-3-pyrrolidinyl]phenol, isolated as an oil that is used without further purification.

(6) m - [1-(cyclopropylcarbonyl)-3-isopentyl-3-pyrrolidinyl]phenyl, M.P. 169–170° C., following crystallization from acetone.

(7) m - [1-(cyclopropylcarbonyl)-3-(2-methylbutyl)-3-pyrrolidinyl]phenol, M.P. 167.5–168.5° C., following crystallization from benzene-light petroleum ether (B.P. 60–80° C.).

(8) m - [1 - (cyclopropylcarbonyl)-3-neopentyl-3-pyrrolidinyl]phenol, isolated as an oil that is used without further purification.

3-(m-methoxyphenyl)-3-alkylpyrrolidines

A stirred suspension of 15.6 g. of sodium amide in 300 ml. of dry benzene is cooled to 5° C. while 58.8 g. of m-methoxybenzyl cyanide is added, the resulting mixture is stirred at 5° C. for 90 minutes, and it is then treated dropwise with 73.8 g. of isopropyl bromide while the temperature is kept below 5° C. The reaction mixture is allowed to warm to 20° C., and is then heated under reflux for two hours. Upon cooling, it is washed with two 200-ml. portions of water, with 100 ml. of 2 N hydrochloric acid, and with 200 ml. more of water, and is dried. The dried solution is evaporated, and the residue is distilled to give α-isopropyl-m-methoxybenzyl cyanide; B.P. 98–104° C./0.3–0.4 mm. Hg. This intermediate product (68 g.) is added to a stirred suspension of 12.8 g. of sodium amide in 170 ml. of dry benzene kept at 5° C., and the resulting mixture is heated under reflux for 3 hours. It is then cooled again to 5° C. while 100 ml. of ethylene dichloride is added, and this new reaction mixture is allowed to warm to room temperature and is heated under reflux for 3 hours. Upon cooling, it is washed with 250 ml. of water, with 100 ml. of 2 N hydrochloric acid, and with 200 ml. more of water, dried, evaporated, and the residue distilled to give 1-chloro-3-(m-methoxyphenyl)-3-cyano-4-methyl-pentane; B.P. 136–140° C./0.8 mm. Hg. This second intermediate product (19.3 g.) is dissolved in 100 ml. of anhydrous ether, and the ethereal solution is added to a stirred suspension of 5.0 g. of lithium aluminum hydride in 150 ml. of anhydrous ether in such manner so as to maintain gentle reflux. The mixture is then heated under reflux for 5 hours, kept at room temperature overnight, and cautiously treated with 10 ml. of water and 15 ml. of 2 N sodium hydroxide. The aqueous mixture is heated under reflux for one hour, cooled, and filtered. The ethereal phase is separated, dried, and distilled to give the desired 3-isopropyl-3-(m-methoxyphenyl)pyrrolidine; B.P. 114–122° C./0.5 mm. Hg.

Utilizing procedures analogous to those described above, the following 3-(m-methoxyphenyl)-3-alkyl pyrrolidines are prepared with appropriate choices of reactants starting from m-methoxybenzyl cyanide by way of the designated intermediate products.

(1) 3 - (m-methoxyphenyl)-3-isobutylpyrrolidine, B.P. 120–124° C./1.0 mm. Hg; from cyclization of 1-chloro-3-cyano-3-(m-methoxyphenyl)-5-methylhexane, B.P. 120–125° C./0.4–0.5 mm. Hg, which is in turn prepared from α-isobutyl-m-methoxybenzyl cyanide, B.P. 117–122° C./0.8 mm. Hg.

(2) 3-(m-methoxyphenyl)-3-sec-butylpyrrolidine, B.P. 122–124° C./0.5 mm. Hg; from cyclization of 1-chloro-3 - cyano - 3-(m-methoxyphenyl)-4-methylhexane, B.P. 115–120° C./0.2 mm. Hg, prepared in turn from α-sec-butyl-m-methoxybenzyl cyanide, B.P. 102–104° C./0.2 mm. Hg.

(3) 3 - (m - methoxyphenyl)-3-(cyclopropylmethyl)-pyrrolidine; B.P. 129–139° C./0.6–0.7 mm. Hg; from cyclization of 1-cyclopropyl-2-cyano-2-(m-methoxyphenyl)-4-chlorobutane, B.P. 144–152° C./0.4–0.5 mm. Hg, prepared in turn from α-cyclopropylmethyl-m-methoxybenzyl cyanide, B.P. 132–138° C./1.0–1.2 mm. Hg.

(4) 3-(m-methoxyphenyl)-3-isopentylpyrrolidine, B.P. 120–125° C./0.15 mm. Hg; from cyclization of 1-chloro-3-cyano-3-(m-methoxyphenyl) - 6 - methylheptane, B.P. 137–145° C./0.2–0.4 mm. Hg, prepared in turn from α-isopentyl-m-methoxybenzyl cyanide, B.P. 120–125° C./0.5–0.6 mm. Hg.

(5) 3 - (m-methoxyphenyl)-3-(2-methylbutyl)-pyrrolidine, B.P. 125–128° C./0.25 mm. Hg; from cyclization of 1-chloro-3-cyano-3-(m - methoxyphenyl)-5-methylheptane, B.P. 154–160° C./0.3–0.5 mm. Hg, prepared in turn from α-(2-methylbutyl)-m-methoxybenzyl cyanide, B.P. 120–128° C./0.5–0.9 mm. Hg.

(6) 3-(m-methoxyphenyl)-3-neopentylpyrrolidine, B.P. 128–130° C./0.7 mm. Hg; from cyclization of 1-chloro-3 - cyano-3-(m-methoxyphenyl)-5,5-dimethylhexane, B.P. 122–134° C./0.4 mm. Hg, M.P. 80–86° C., following crystallization from light petroleum ether (B.P. 40–60° C.), which is prepared in turn from α-neopentyl-m-methoxybenzyl cyanide, B.P. 108–117° C./0.25–0.45 mm. Hg.

N-cyclopropylmethyl-3-(m-isopropoxyphenyl)-3-propylpyrrolidine

To a solution of sodium methoxide, prepared from 46 g. of sodium and 600 ml. of methanol is added a solution of 248 g. of m-hydroxybenzaldehyde in 400 ml. of methanol, and the resulting mixture is in turn added to a cooled, stirred suspension of 36 g. of potassium borohydride in 280 ml. of methanol. The mixture is stirred at room temperature overnight, heated under reflux for about 2–3 hours, and then cooled to 0° C. while 36 g. of isopropyl bromide is added. This new reaction mixture is heated under reflux for 6 hours and evaporated to remove solvent. The residue is dissolved in water, the aqueous solution is extracted with ether, and the ether extract is dried and distilled to give m-isopropoxybenzyl alcohol, B.P. 105° C./1 mm. Hg.

To a stirred mixture consisting of 270 g. of m-isopropoxybenzyl alcohol, 158 g. of pyridine, and 260 ml. of ether, cooled to 0–5° C., is added in a dropwise manner 250 g. of thionyl chloride. The mixture is then evaporated to remove ether, and the residue is heated under reflux for 90 minutes, cooled, and poured into two liters of iced water. The resulting aqueous mixture is extracted with ether, and the ether extracts are washed with water, dried, and distilled to give m-isopropoxyybenzyl chloride, B.P. 96° C./1.5 mm. Hg.

A mixture consisting of 257 g. of m-isopropoxylbenzyl chloride, 260 g. of potassium cyanide, 38.5 g. of potassium iodide, 270 ml. of ethyl alcohol, and 180 ml. of water is heated under reflux for 8 hours, cooled, filtered, and the filtrate evaporated to remove ethanol. The residue is treated with 200 ml. of water, the aqueous solution is extracted with ether, and the ether extracts are dried and distilled to give m-isopropoxybenzyl cyanide, B.P. 130–134° C./1.7 mm. Hg.

A mixture of 720 g. of m-isopropoxybenzyl cyanide, 49 g. of sodium amide, and 300 ml. of dry ether is heated under reflux for two hours and then cooled to 10–20° C. while 155 g. of n-propyl bromide is added. The reaction mixture is then stirred at room temperature for 20 hours, treated with 250 ml. of water, and the ethereal phase is separated and set aside. The aqueous phase is extracted with ether, the extracts are combined with the separated ethereal phase, and the combined ethereal solution is dried and distilled to give α-propyl-m-isopropoxybenzyl cyanide, B.P. 120–124° C./0.45 mm. Hg. This intermediate (117 g.) is added to a suspension of 21 g. of sodium amide in 560 ml. of ether, the mixture is stirred and heated under reflux for 3 hours, it is then cooled to 0–10° C. while 117 g. of 2-bromoacetal is added, and the new mixture is stirred at room temperature for 18 hours and then treated with 200 ml. of water. The ethereal phase is separated and set aside, and the aqueous layer is extracted with ether. The extracts are combined with the separated ethereal phase, and the combined ethereal solution is dried and distilled to give 1,1-diethoxy-3-(m-isopropoxyphenyl)-3-cyanohexane, B.P. 140–160° C./0.4 mm. Hg.

A mixture consisting of 85.5 g. of 1,1-diethoxy-3-(m-isopropoxyphenyl)-3-cyanohexane, 30 g. of 10% palladium-on-charcoal, 1140 ml. of absolute ethanol, and 125 ml. of 25% sulfuric acid is shaken with hydrogen at 500 lbs./in.$^2$ at 60–80° C. for 24 hours. The mixture is filtered, the filtrate is evaporated, and the residue is dissolved in 1000 ml. of water. The aqueous solution is washed with ether, made alkaline with 10 N sodium hydroxide, and the alkaline mixture is extracted with ether. The ether extracts are dried and distilled to give 3-(m-isopropoxyphenyl)-3-propylpyrrolidine, B.P. 138–146° C./0.45 mm. Hg.

A mixture consisting of 5.0 g. of 3-(m-isopropoxyphenyl)-3-propylpyrrolidine, 6.3 g. of anhydrous potassium carbonate, 2.3 g. of cyclopropylmethyl chloride, and 30 ml. of 2-butanone is stirred and heated under reflux for 6 hours, kept at room temperature overnight, and then poured into a mixture of 150 ml. of water and 75 ml. of ether. The ethereal phase is separated and set aside, and the aqueous phase is extracted with ether. The combined extracts and separated ethereal phase are then extracted with 2 N hydrochloric acid, the acidic extract is made alkaline with 1 N sodium hydroxide, and the alkaline mixture is extracted with ether. The ether extracts are dried and distilled to give the desired N-cyclopropylmethyl - 3 - (m-isopropoxyphenyl)-3-propylpyrrolidine, B.P. 133–140° C./0.3 mm. Hg.

N-cyclopropylmethyl-3-(m-methoxyphenyl)-3-propylpyrrolidine

N - cyclopropylcarbonyl - 3 - (m-methoxyphenyl)-3-propylpyrrolidine, B.P. 165–170° C./0.2 mm. Hg, is first prepared by reacting 3 - (m - methoxyphenyl)-3-propylpyrrolidine with cyclopropylcarbonyl chloride in the presence of triethylamine according to the general procedure described earlier. A solution of 70 g. of N-cyclopropylcarbonyl - 3 - (m-methoxyphenyl)-3-propylpyrrolidine in 100 ml. of tetrahydrofuran is added to a stirred suspension of 20 g. of lithium aluminum hydride in 800 ml. of ether, and the mixture is stirred and heated under reflux for 3 hours, cooled, treated with 120 ml. of water and heated under reflux for 30 minutes more. After filtration, the organic phase is separated, dried and distilled to give the desired N-cyclopropylmethyl-3-(m-methoxyphenyl)-3-propylpyrrolidine, B.P. 132–136° C./0.5 mm. Hg.

N-cyclobutylmethyl-3-(m-isopropoxyphenyl)-3-propylpyrrolidine

N - cyclobutylcarbonyl - 3 - (m-isopropoxyphenyl)-3-propylpyrrolidine is first prepared by reacting 3 - (m-isopropoxyphenyl) - 3 - propylpyrrolidine with cyclobutylcarbonyl chloride in the presence of triethylamine according to the general procedure described earlier for similar reactions. This intermediate compound is then reduced by reaction with lithium aluminum hydride in tetrahydrofuran, according to the procedure described above, to give the desired N-cyclobutylmethyl-3-(m-isopropoxyphenyl)-3-propylpyrrolidine, B.P. 135–140° C./0.2 mm. Hg.

Resolution of optical isomers

A solution of 38.6 g of (−)-di-(p-toluoyl)-D-tartaric acid in 300 ml. of ethanol is added to a solution of 27.3 g. of m-[1-(cyclopropylmethyl) - 3 - isobutyl-3-pyrrolidinyl]phenol (as prepared according to Example 2(d) or Example 3) in 300 ml. of absolute ethanol, and the mixture is stirred at room temperature overnight. The crystalline salt that separates is collected on a filter, and the mother liquor filtrate is set aside. The solid salt is recrystallized several times from absolute ethanol and is then shaken with 6 N aqueous ammonia to liberate the free base, which is extracted into ether. The ether extract is washed with ammonia and with water, dried over magnesium sulfate, and evaporated to give a residue of the levorotatory isomer of m-[1-(cyclopropylmethyl) - 3 - isobutyl - 3 - pyrolidinyl]phenol; B.P. 182° C./0.4 mm. Hg; [α]$_D^{25}$ −21.8° (in ethanol, 1.050 g./100 ml.). The monosuccinate is obtained by dissolving the levorotatory free base in absolute ethanol, adding an equivalent amount of succinic acid, and isolating the solid salt that precipitates. Following crystallization from ethanol, the monosuccinate has M.P. 127–128° C. and [α]$_D^{25}$ −14.1° (in ethanol, 0.993 g./100 ml.).

The mother liquor filtrate set aside above in the original salt formation with (−)-di-(p-toluoyl)-D-tartaric acid is evaporated to dryness, and the free base (enriched in the dextrorotatory isomer) is liberated from the salt residue by treatment with aqueous ammonia as described above. A solution of 9.0 g. of this free base in 125 ml. of ethanol is mixed with a solution of 12.7 g. of (+) - di - (p - toluoyl) - L - tartaric acid in 125 ml. of ethanol, and the mixture is stirred at room temperature overnight. The crystalline salt obtained is collected on a filter, recrystallized several times from ethanol, and treated with 6 N aqueous ammonia to liberate the free base as described above. The product obtained is the dextrorotatory isomer of m-[1-(cyclopropylmethyl)-3-isobutyl - 3 - pyrrolidinyl]phenol; B.P. 176–178° C./0.6 mm. Hg; [α]$_D^{25}$ +21.6° (in ethanol, 0.950 g./100 ml.). The monosuccinate is obtained by reacting the free base with succinic acid in absolute ethanol; M.P. 125–126° C., following crystallization from ethanol; [α]$_D^{25}$ +14.1° (in ethanol, 0.957 g./100 ml.).

I claim:

1. A member of the class consisting of 1-cycloalkylmethyl - 3 - alkyl - 3 - (m-oxyphenyl)pyrrolidine compounds having the formula

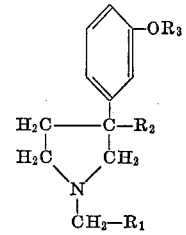

and pharmaceutically-acceptable salts thereof; where $R_1$ is a member of the class consisting of cyclopropyl and cyclobutyl, $R_2$ is a member of the class consisting of cyclopropylmethyl and alkyl of not more than 5 carbon atoms, and $R_3$ is a member of the class consisting of hydrogen and an acyl group having the formula

where $R_4$ is a member of the class consisting of cyclopropyl, cyclobutyl, and alkyl of not more than 9 carbon atoms.

2. A compound according to claim 1 which is m-[1-(cyclopropylmethyl)-3-propyl - 3 - pyrrolidinyl]phenol.

3. A compound according to claim 1 which is an acid-addition salt of m-[1-(cyclopropylmethyl)-3-propyl-3-pyrrolidinyl]phenol.

4. A compound according to claim 1 which is m-[1-(cyclopropylmethyl)-3-propyl - 3 - pyrrolidinyl]phenol monosuccinate.

5. A compound according to claim 1 which is m-[1-(cyclopropylmethyl) - 3 - isobutyl-3-pyrrolidinyl]phenol.

6. A compound according to claim 1 which is the levorotatory optical isomer of m-[1-(cyclopropylmethyl)-3-isobutyl-3-pyrrolidinyl]phenol.

7. A compound according to claim 1 which is an acid-addition salt of m-[1-(cyclopropylmethyl) - 3 - isobutyl-3-pyrrolidinyl]phenol.

8. A compound according to claim 1 which is m-[1-(cyclopropylmethyl) - 3 - isobutyl-3-pyrrolidinyl]phenol monosuccinate.

9. A compound according to claim 1 which is the levorotatory optical isomer of m-[1-(cyclopropylmethyl)-3-isobutyl-3-pyrrolidinyl]phenol monosuccinate.

10. A compound according to claim 1 which is m-[1-(cyclopropylmethyl)-3-ethyl-3-pyrrolidinyl]phenol.

11. A compound according to claim 1 which is m-[1-(cyclopropylmethyl) - 3 - (neopentyl) - 3 - pyrrolidinyl] phenol.

12. A compound according to claim 1 which is m-[1-(cyclopropylmethyl) - 3 - propyl - 3 - pyrrolidinyl]phenyl acetate.

13. A compound according to claim 1 which is m-[1-(cyclopropylmethyl) - 3 - propyl - 3 - pyrrolidinyl]phenyl isobutyrate.

References Cited
UNITED STATES PATENTS 2,975,193    3/1961    Dice et al.

NICHOLAS S. RIZZO, Primary Examiner

J. A. NARCAVAGE, Assistant Examiner

U.S. Cl. X.R.

260—326.5; 424—274